J. W. GOSLING.

Step-Covers and Wheel-Fenders for Vehicles.

No. 5,644. Reissued Nov. 4, 1873.

Attest

W. Thurston

John Jones

Inventor

John W. Gosling

By F. Milliard

Attorney

A.M.S. PHOTO-LITHOGRAPHIC CO. N.Y. OSBORNE'S PROCESS.

UNITED STATES PATENT OFFICE.

JOHN W. GOSLING, OF CINCINNATI, OHIO.

IMPROVEMENT IN STEP-COVERS AND WHEEL-FENDERS FOR CARRIAGES.

Specification forming part of Letters Patent No. 62,406, dated February 26, 1867; reissue No. 5,644, dated November 4, 1873; application filed June 24, 1873.

*To all whom it may concern:*

Be it known that I, JNO. W. GOSLING, of Cincinnati, in the county of Hamilton and State of Ohio, have invented a new and useful Combined Step-Cover and Wheel-Fender for Carriages, of which the following is a specification:

My invention consists of a cheap and simple device for preventing the accumulation of mud and dust on the steps of carriages, &c., and also for guarding the clothes of the rider from coming in contact with the wheels on entering or leaving the vehicle.

Figure 1:
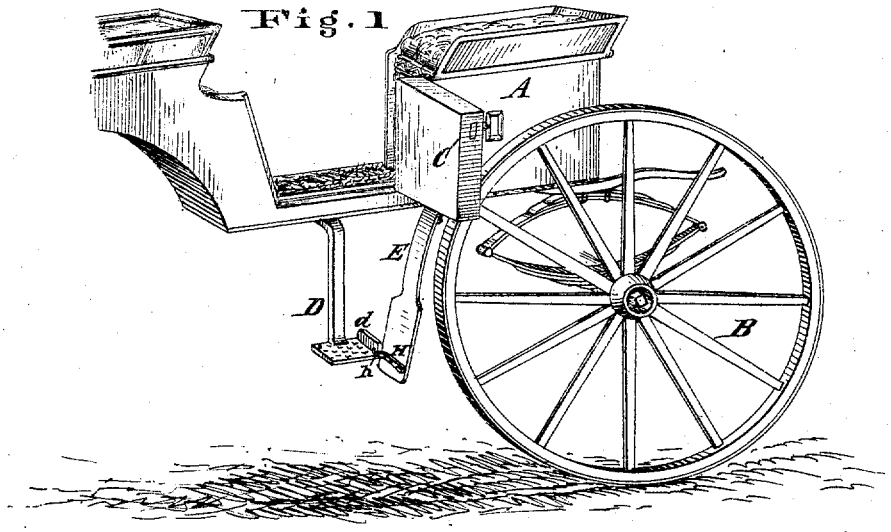
Figure 2:
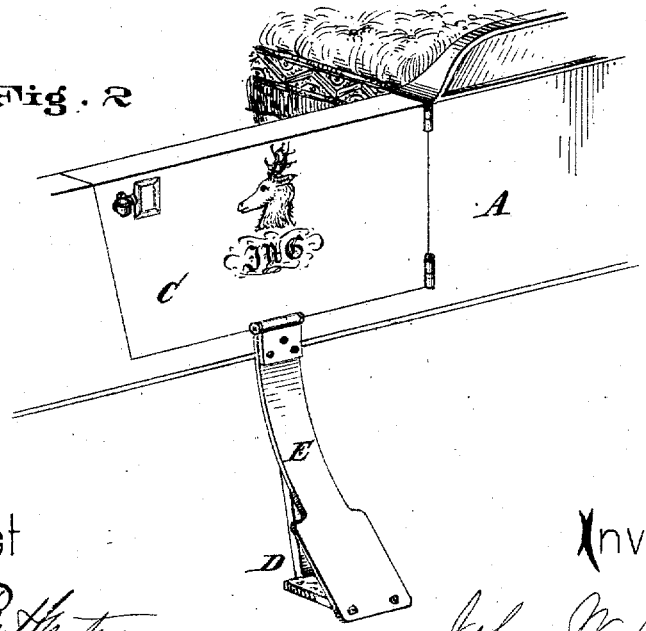

In the accompanying drawings, Figure 1 shows the position of my fender when the carriage-door is open. Fig. 2 represents it when the door is closed.

A represents the body of the carriage; B, the rear wheel; C, the door, and D the step. E is a plate, which may be made of sheet metal or other suitable material, and the upper end of said plate is hinged or otherwise secured to the door C. The lower end of the combined cover and fender E may be connected to the bar H, having an eye, *h*, which engages with a suitable aperture in the flange *d* of the step. This provision of the perforated flange *d* and eye *h*, by reason of its loose character, permits the cover and fender E to turn freely in either direction as the door C is opened or closed. The cover and fender E I prefer to make of flexible material, so that it may bend in the act of opening and closing the door, (see dotted lines in Fig. 1,) and its elasticity enables it to hold the door firmly in either the closed or wide-open position, when the cover and fender are connected, as shown, to the step D.

When the door C is shut, the plate E closes up over the step D, and prevents the wheel from throwing dirt over the step, as clearly shown in Fig. 2; but as soon as the door is opened, the cover and fender E, being attached to the door C, is, of course, carried with the door, and thus the step is uncovered, and the plate E then occupies such a position as to enable it to serve as a fender to prevent the rider's clothes, on entering or leaving the carriage, from coming in contact with the hind wheel of the carriage, as represented in Fig. 1. The said plate E may be covered with leather, or painted, or may consist wholly of leather.

I have selected for illustration the preferred form of my invention, but reserve the right to vary the same, it being susceptible of being made to assume various forms and modifications—for example, instead of being pivoted to the step D, the lower end of the plate E may be hinged or otherwise coupled to a frame projecting from the carriage-body and passing under the step. In some cases, when the distance from the wheel to the body is short, I provide slots on both step and fender, or one of them, to partially or wholly relieve the plate of the flexion incident to opening or closing the doors.

The important feature of my invention is the plate E attached to the door of the carriage, and operating, by reason of such attachment, as a step-cover when the door is closed, and as a wheel-fender when the door is open.

I claim—

1. In combination with the step D and the door C, the plate E attached to the door, to operate as a step-cover when the door is closed, and a wheel-fender when the door is open, substantially as and for the purpose specified.

2. A combined step-cover and wheel-fender for carriages, consisting of the flexible plate E, the upper end of which is attached to the carriage-door, and the lower end to the step, all being combined to operate as a step-cover, wheel-fender, and a spring-connection to retain the door in the opened and closed positions, all substantially as set forth.

In testimony of which invention I hereunto set my hand.

JOHN W. GOSLING.

Witnesses:

FRANK MILLWARD,
R. M. HUNTER.